(12) United States Patent
Amela et al.

(10) Patent No.: US 7,333,240 B2
(45) Date of Patent: Feb. 19, 2008

(54) COLOR IMAGE PROCESSOR

(75) Inventors: Eduardo Amela, Barcelona (ES); Steven J. Simske, Fort Collins, CO (US); Jordi Arnabat Benedicto, Tarragona (ES); Oscar Martinez, Castelldefels (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 1024 days.

(21) Appl. No.: 10/676,237

(22) Filed: Oct. 1, 2003

(65) Prior Publication Data

US 2005/0073719 A1 Apr. 7, 2005

(51) Int. Cl.
*G06F 15/00* (2006.01)
*G06K 1/00* (2006.01)
*H04N 1/40* (2006.01)

(52) U.S. Cl. .................. 358/1.9; 358/2.1

(58) Field of Classification Search .............. 358/1.9, 358/1.15, 1.1, 1.2, 1.12, 1.14, 1.17, 1.18, 358/2.1, 3.09
See application file for complete search history.

(56) References Cited

U.S. PATENT DOCUMENTS

| | | |
|---|---|---|
| 5,579,446 A | 11/1996 | Naik et al. |
| 5,611,030 A | 3/1997 | Stokes |
| 5,704,021 A | 12/1997 | Smith et al. |
| 5,734,368 A | 3/1998 | Meyers et al. |
| 5,767,978 A | 6/1998 | Revankar et al. |
| 5,933,256 A | 8/1999 | Ebner |
| 6,006,013 A | 12/1999 | Rumph et al. |
| 6,252,677 B1 | 6/2001 | Hawes et al. |
| 6,256,104 B1 | 7/2001 | Rumph et al. |
| 6,327,043 B1 | 12/2001 | Rumph et al. |

*Primary Examiner*—Douglas Q. Tran

(57) ABSTRACT

A color image processor is configured to locate at least two zones within a document. Within the zones, content types are recognized, wherein the content types may include: text and lines; graphic images; photographic images; and background. A color rendering intent is applied to each of the at least two zones based on the content type within the zone. The zones are then merged into an image.

40 Claims, 6 Drawing Sheets

COLOR IMAGE PROCESSOR

BACKGROUND

Many people prefer photo images that are more colorful, more contrasted and more carefully illuminated than the actual scene that was photographed. Accordingly, photo film manufacturers may sell film that increases the vividness (in particular, the saturation level) of the colors and the contrast of pictures, resulting in higher perceived image quality.

Many people also have preconceived notions about what color certain objects within images should be, such as people's faces, the sky, landscape foliage, and other objects, particularly including red objects, such as fire trucks or fire hydrants. When such objects fail to conform to the preconceived expectations, perceived image quality is lessened. This may be the case, for example, even when the image accurately reflects the reality of a scene that was photographed.

Many documents have a number of objects or regions. Accordingly, application of a first rendering, color mapping and half-toning algorithm may result in acceptable image quality for a first object, but unacceptable image quality for a second object. As a result, the overall appearance of the document may be less than desirable.

While one possible solution involves manual operation of software applications like Adobe® Photoshop®, most photographers want something much closer to instant gratification. Additionally, problems associated with the calibration of a monitor and a printer for consistent color display add considerably to the difficulties associated with such applications. Accordingly, improved methods of color image processing, which result in a perception of improved image quality, are needed.

SUMMARY

A color image processor is configured to locate at least two zones within a document. Within the zones, content types are recognized, wherein the content types may include: text and lines; graphic images; photographic images; and background. A color rendering intent is applied to each of the at least two zones based on the content type within the zone. The zones are then merged into an image.

BRIEF DESCRIPTION OF THE DRAWINGS

The following detailed description refers to the accompanying figures. In the figures, the left-most digit(s) of a reference number identifies the figure (FIG.) in which the reference number first appears. Moreover, the same reference numbers are used throughout the drawings to reference like features and components.

DETAILED DESCRIPTION

Figure 1:
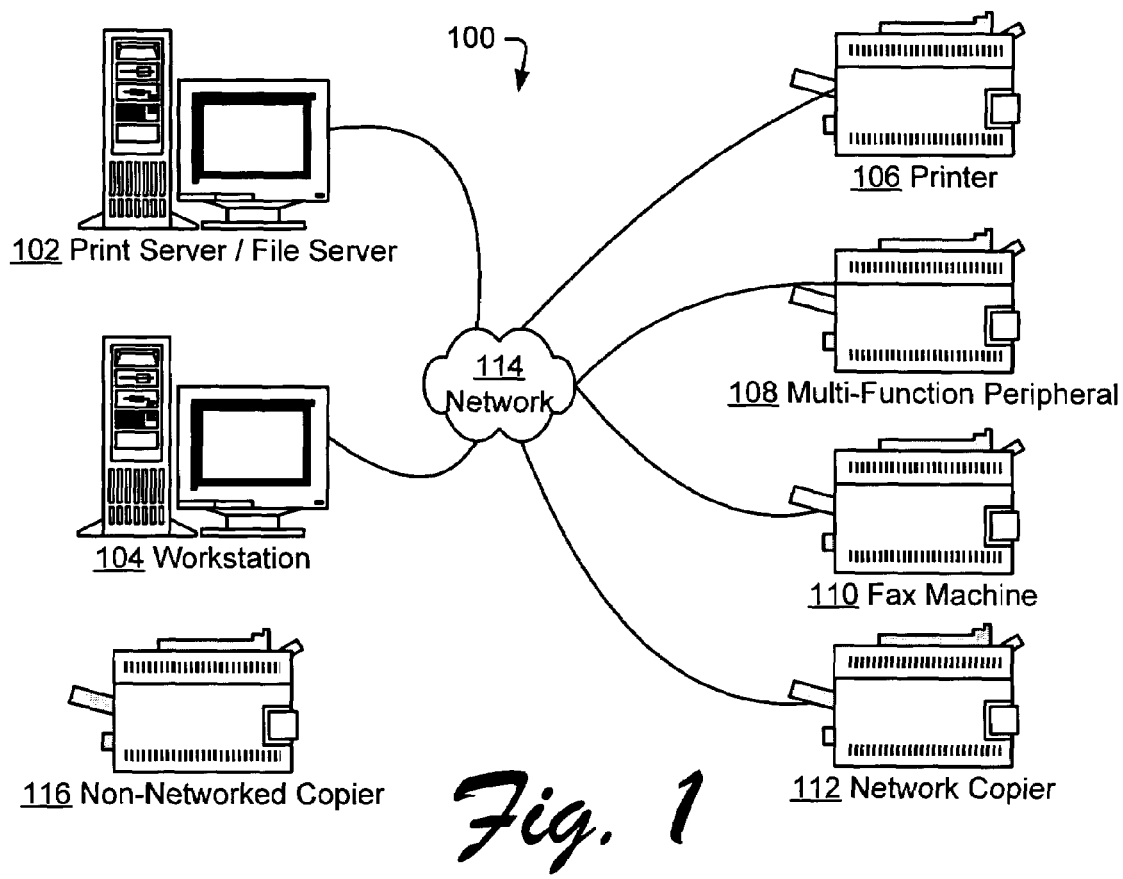
FIG. 1 is a diagram showing an exemplary environment within which an exemplary color image processor may be configured to operate.

FIG. 1 is a diagram showing an environment 100 within which a color image processor may be configured to operate. The color image processor may be located on a print server 102, workstation 104, printer 106, multi-function peripheral 108, fax machine 110, network copier 112 or other device in communication with a network 114. Additionally, the color image processor may be configured to operate on a non-networked device, such as a stand-alone copy machine 116. And still further, the color image processor may be configured to operate on monitors, cinema displays, TVs and in a wide range of other applications not specifically illustrated, but which may be easily recognized.

Figure 2:
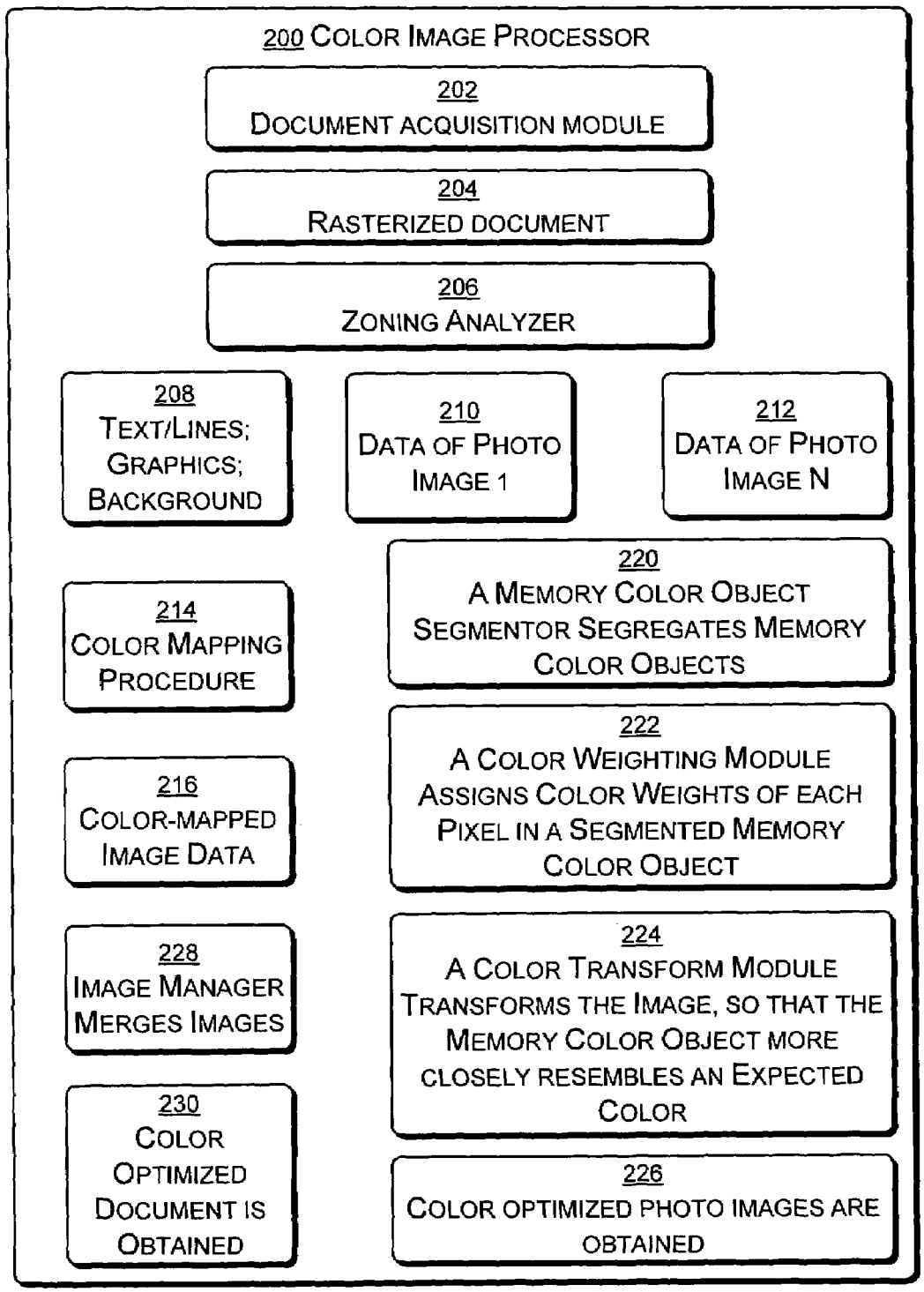
FIG. 2 is a block diagram showing an exemplary structure of a color image processor.

FIG. 2 is a block diagram showing exemplary structure of a color image processor 200. A document acquisition module 202 obtains a document from any of a variety of sources. As seen in FIG. 1, the document may be obtained by a print server 102 or by a workstation 104. The document may be generated by an application (e.g. a word processor) on the workstation 104, or obtained from a camera or similar image capture device. The document may be obtained as a fax, or obtained by scanning, such as by a networked copier 112 or non-networked copier 116. Once obtained, the document may be rasterized, thereby creating a rasterized document 204, which is sent to a zoning analyzer 206.

Figure 3:
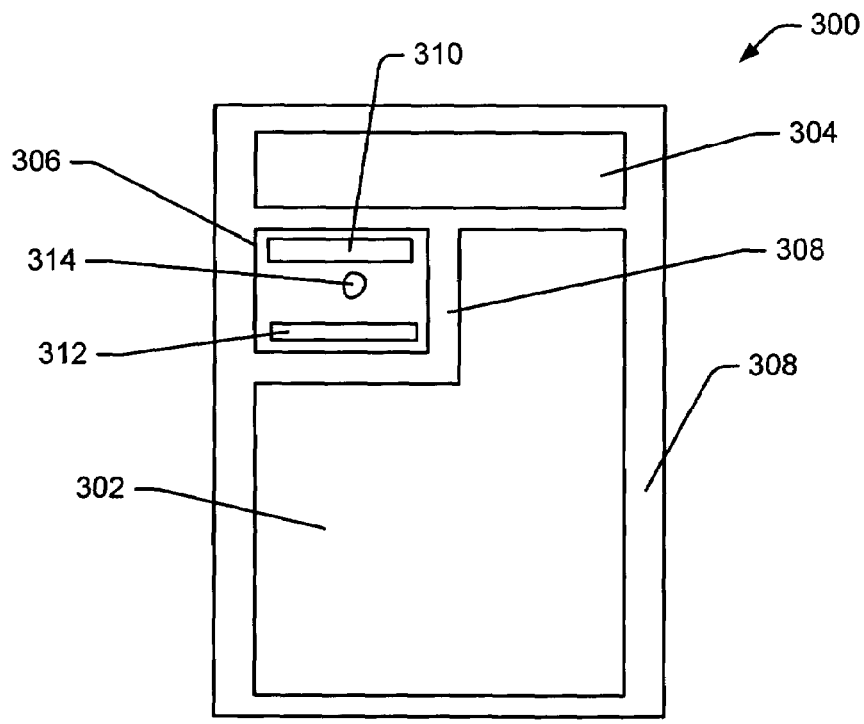
FIG. 3 is a diagram showing an exemplary document, illustrating zones within the document that may be separately processed.

As will be seen in greater detail below, an exemplary zoning analyzer 206 is configured to examine the document and determine if one or more zones may be distinguished. An exemplary document 300 having a plurality of zones is seen in FIG. 3. A large region of text 302 forms a first zone; a region of graphics 304, such as a corporate logo, forms a second zone; a region including a color photograph 306 forms a third zone; and a fourth zone includes the background area 308. Operation of the exemplary zoning analyzer 206 segregates data 208 associated with a text zone 302, a graphics zone 304 and a background zone 308. Additionally, the zoning analyzer 206 may be configured to segregate data 210-212 associated with one or more color photographs 306.

The data 208 associated with text/lines, graphics (e.g. line art, logos, etc.) and backgrounds may be mapped by a color mapping procedure 214 to produce color-mapped image data 216. In a typical embodiment, graphics are rendered using a saturation rendering intent, and text is rendered to reduce color in areas where a neutral hue is intended.

The data 210-212 associated with one or more color photographs may be processed by a memory color object segmenter 220. The memory color object segmenter processes data in the photo images 210-212 to discover, segregate or segment memory color objects within the photo data 210-212. Memory color objects may be objects within the photograph-such as grass and foliage, the sky and possibly peoples' faces—for which many people have a predetermined idea of the expected color. Referring again to FIG. 3, exemplary memory color objects may include portions of a photograph, such as blue sky 310, green grass 312, and different skin tones 314. The data associated with these objects may be segmented by the memory color object segmenter 220.

The memory color object segmenter 220 may be configured to use a number of algorithms to locate memory color objects within the data 210-212 representing one or more color photographs. For example, the memory color object segmenter 220 may initially evaluate an approximate shape and/or an approximate location within the color photograph of an object to determine if it is likely to be a memory color object. Where the geometric and/or spatial factors indicate that an object may be a memory color object, the color of the object may be reviewed. For example, where the color of pixels within the object is within a threshold of an expected color of a memory color object, then this may result in classification of the object as a memory color object. Thus, a green object located at the bottom of a photograph may be classified as a memory color object based on an assumption that the object is grass or similar foliage. Similarly, a blue object at the top of the photograph may be classified as a memory color object based on an assumption that the object is the sky, based on its approximate color and appropriate location.

A color weighing module 222 may be used to assign color weights (e.g. fractional values) to data representing each pixel within a color image generally, and within a memory color object 310-314 particularly. For example, each pixel may be assigned a weight—such as a fraction from 0% to 100%—reflecting the degree to which the data representing the pixel's color will be altered. Thus, the color of each pixel within an image may be assigned a weight from 0% to 100%; however pixels within a memory color object are more likely to be assigned greater weights and moved greater distances within a color space. Other pixels, not located within memory color objects are moved distances which are typically less than the distance moved by pixels within memory color objects. However, movement of pixels not within memory color objects tends to prevent the image from losing an overall color "balance" or appearance. In general, the color weighing module 222 moves the color of pixels within memory color objects more aggressively than the color of pixels not within memory color objects. For example, the weights assigned to pixels within memory color objects tend to be greater than the weights assigned to pixels not within memory color objects. In a further example, the weights can be randomized to δ±σδ where σ=random(0, 0.5), giving a range of 50-150%, for example, of the expected movement, δ, in Lab space.

Figure 4:
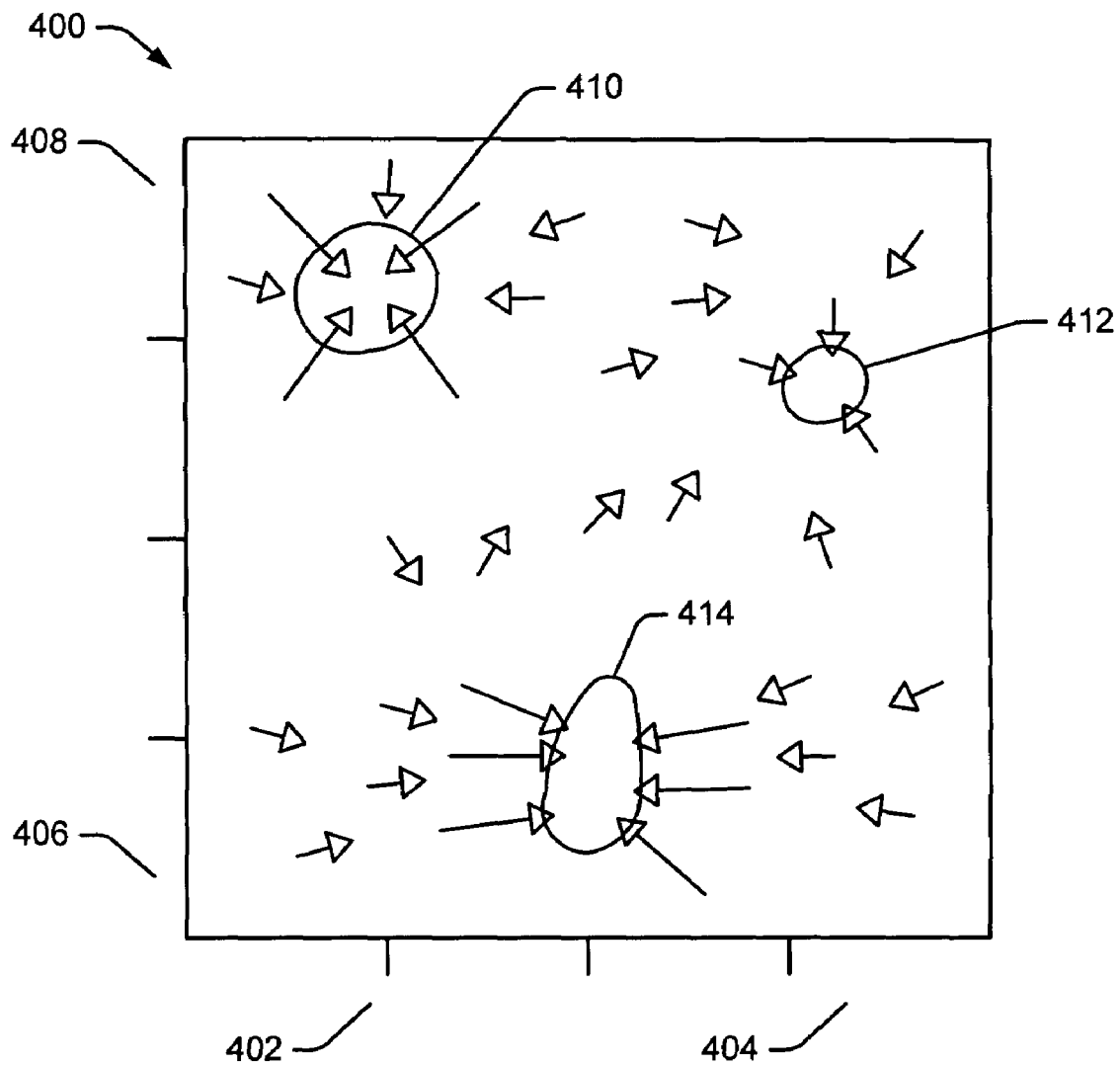
FIG. 4 is diagram illustrating an exemplary slice of an Lab color space, wherein arrows represent changes in the hue of pixels and exemplary memory color objects are shown in outline.

An exemplary configuration of the color weighing module 222 may be understood with reference to FIG. 4. FIG. 4 shows a view of Lab color space 400, wherein green 402 is toward the left, red 404 is toward the right, blue 406 is toward the bottom and yellow 408 is toward the top. The arrows in FIG. 4 represent the color of exemplary pixels within or near memory color objects, wherein the base of the arrow is a starting pixel color and the tip of the arrow is an ending pixel color. The length of the arrows is important, and indicates the distance within a color space that a pixel's color is mapped. In general, the closer a memory color object's color is to a preferred color for that memory color object, the longer the arrow, thereby representing "more aggressive" mapping of the color to the preferred color. Conversely, if an object suspected of being a memory color object is further from the expected color (e.g. more than 15 dE away, (where dE (delta E) is the in color space from one measurement to another) then no arrow (or a very short arrow) would indicate no (or very slight) color mapping. And still further, a pixel not within a region suspected of being a memory color object may be associated with a shorter arrow implying less aggressive color mapping. Thus, the physical location of pixels within the image remains stationary, but the pixel's color may be mapped within the color space. The direction and length of the arrow represent the weight and mapping applied to the pixel. In a typical application, a percentage of the pixels within the memory color object are mapped, and each pixel that is mapped may be mapped some, most, or all of the way to the expected color of the memory color object. Specifically, the color weighing module 222 may assign a positive weight to some of the pixels within a memory color object, so that the color transform module 224 is able to map pixel colors within the memory color object to more closely resemble their expected values. The mapping performed by module 224 may include the use of color look-up tables (LUTs) or other tools, the operation of which may be altered from conventional practice by addition of the weights provided by module 222. Three exemplary expected memory color object color ranges are illustrated: green grass 410; one type of skin tone 412; and blue sky 414.

Note that dE (delta E) seen above, is the change in color space from one color measurement to another. Color is typically measured using the Hunter scale, using a color meter that displays three values, L, "a" and "b". L is a scale from 0 to 100 and is dark to light or black to white. The value "a" is on a scale going from −a to +a; −a is green and the more negative, the more green; and +a is red and the more positive, the more red the color is.

Similarly, the value "b" is a scale going from −b to +b; −b is blue and the more negative, the more blue the color is; and +b is yellow and the greater the value is, the more yellow the color is. To calculate Delta E, two measurements may be taken, yielding L1, a1, b1 for the first measurement, and L2, a2, b2 for the second measurement.

Using the measurements: Delta E $((L1-L2)^2+(a1-a2)^2+(b1-b2)^2)^0.5$. Color space is generally plotted as 3D color space. L is the vertical axis, with −a to +a and −b to +b in a horizontal plane. The plot of any given L, a, b is a point in the color space. Delta E is the distance between the two points.

Returning to FIG. 2, color optimized photo images 226—having memory color objects whose color more closely resembles an expected hue—are then merged by an image manager 228 into a color optimized document 230.

Figure 5:
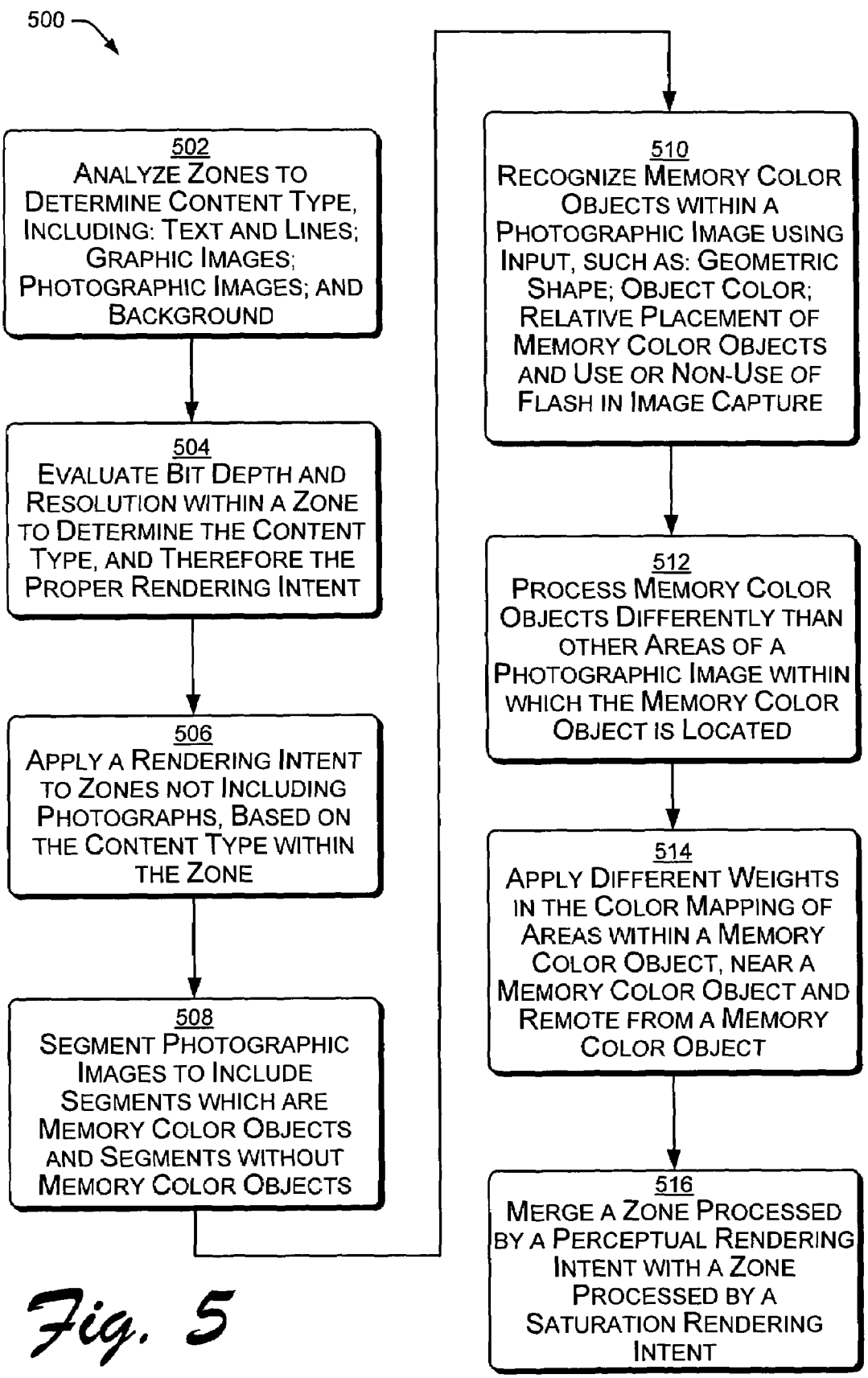
FIG. 5 is flow diagram showing a first exemplary method by which a color image processor may be operated.

FIG. 5 is flow diagram showing a first exemplary method 500 by which a color image processor 200 may be operated. At block 502, zones are analyzed to determine content type, including test and lines, graphic images, photographic images and background. For example, a zoning analyzer 206 may be used to analyze the zones of a rasterized document 204. Regions within the document will be found to be either text, lines or line-art, graphics, photographic images, background or other content type. At block 504, the determination of content type may be made by evaluation of bit-depth and/or resolution within a zone. By determining the bit-depth of the data within the zone, and/or by determining the resolution within the zone, an association may be made with a type of content the data is most likely to represent. In some applications, the content type may imply a certain type of rendering intent. For example, if the content type is determined to be graphics, such as a business logo, then a saturation rendering intent is typically appropriate. Accordingly, at block 506 a rendering intent is applied to zones not including photographs, based on the content type within the zone.

At block 508, photographic images are segmented to include segments that are memory color objects and segments without memory color objects. Such segmentation may be performed by a memory color object segmenter 220. As seen above, memory color objects can be objects within a photographic image which have an expected color, based on the memory of the viewer. For example, the sky is expected to have a shade of blue. Memory color objects may be recognized within a photographic image, as seen in block 510, using algorithms based on input such as: geometric shape of the object; object color; relative placement of an object (i.e. location of the object relative to other objects and/or to the borders of the image); neural net-based or other training on a corpus; use or non-use of photographic flash in capturing an image, and discovery of other camera settings, such as f-stop for focal distance, etc.

At block 512, segments of a photograph including memory color objects are processed differently than other areas of the photograph within which the memory color object is located. For example, at block 514, different weights may be applied to areas within a memory color object, near a memory color object and remote from a memory color object. The concept of weights is illustrated generally by FIG. 4. Thus, a LUT (look up table) portion of transform module 224 may be configured to provide, for example, a perceptual rendering intent that is a function of the weight applied to color of a given pixel. The weights determine how aggressively the colors are mapped by the LUT or similar tool. For example, colors of pixels thought to be within a memory color object are mapped a greater distance through a color space than are the colors of pixels adjacent to a memory color object, or not within a memory color object.

At block 516, two zones or more zones are merged together, such as by an image manager 228. For example, a zone processed by a perceptual rendering intent 226 may be merged with a zone processed by a saturation rendering intent 216 to result in a color optimized document 230 having a plurality of zones.

Figure 6:
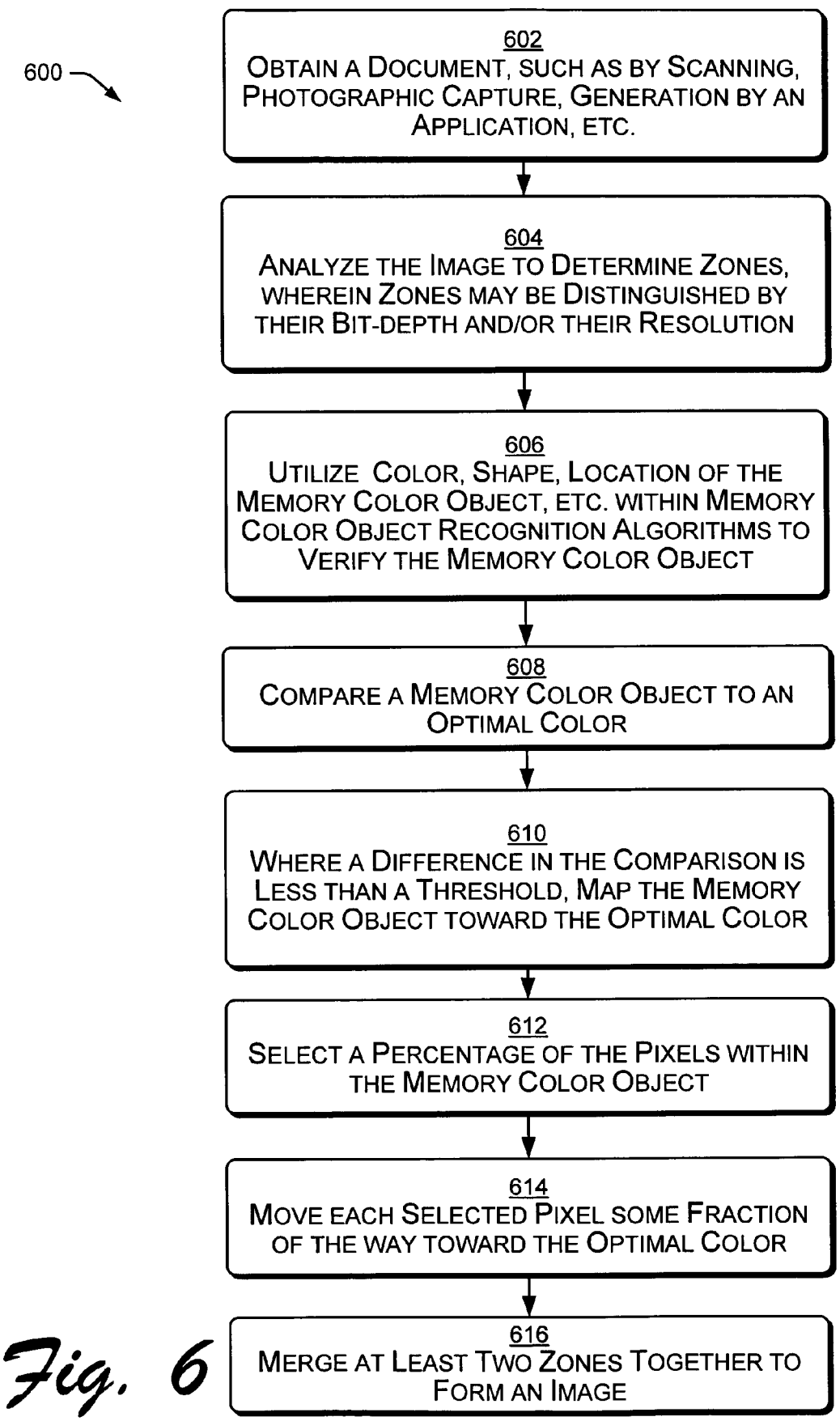
FIG. 6 is flow diagram showing a second exemplary method by which a color image processor may be operated.

FIG. 6 is flow diagram showing a second exemplary method 600 by which a color image processor 200 may be operated. At block 602, a document is obtained, such as by scanning (e.g. scanner, fax machine, photocopy machine, etc.), photographic capture, generation by an application (e.g. presentation creation software) or other means. At block 604, the image is analyzed to determine zones, such as by a memory color object segmenter 220. The zones may be distinguished from each other by content, and the content may be distinguished by the bit-depth of the data and/or the resolution (e.g. pixels per inch) of the data. The user can also edit this analysis, for example, by operation of the user interface of an editing tool, thereby indicating the user's preferences in processing the image data.

At block 606, the memory color object segmenter 220 may execute memory color object recognition algorithms utilizing color, shape, location of the memory color object, etc. to verify that a group of pixels is a memory color object, such as within a photograph. At block 608, where the memory color object is verified, it is compared to the optimal color. At block 610, where a difference in the comparison of the memory color object and the optimal color is less than a threshold value, the memory color object is mapped toward the optimal color. Where the threshold is exceeded, it may be the case that the memory color object should not be the "preferred" color. For example, the night sky should not be the daytime shade of blue.

At block 612, where the threshold is not exceeded, a color transform module 224 may be used to map the color of the pixels in the memory color object. In one implementation, a percentage of the pixels within the memory color object may be selected for mapping toward an optimal color. At block 614, each selected pixel may be moved some fraction of the way from the original color to a preferred color. Similarly, each pixel may be moved in saturation, but not in hue or intensity. Accordingly, the memory color may be achieved, but without affecting the overall brightness of the image. Referring to FIG. 4, it can be seen that changes in the colors of pixels are represented by arrows, wherein the change is more particularly represented by the distance and direction of the arrow from an initial color at the base of the arrow to a final color at the tip of the arrow. Since in many cases the color of only some pixels is adjusted, and the amount of the adjustment (i.e. the arrow length) differs, the color transition is less likely to produce artificial-looking artifacts.

At block 616, the at least two zones, such as those found during the operation of block 604, are merged together to form an image which may be printed. Referring to the example of FIG. 3, the zones 302-308 may be recombined, and the document 300 printed.

Figure 7:
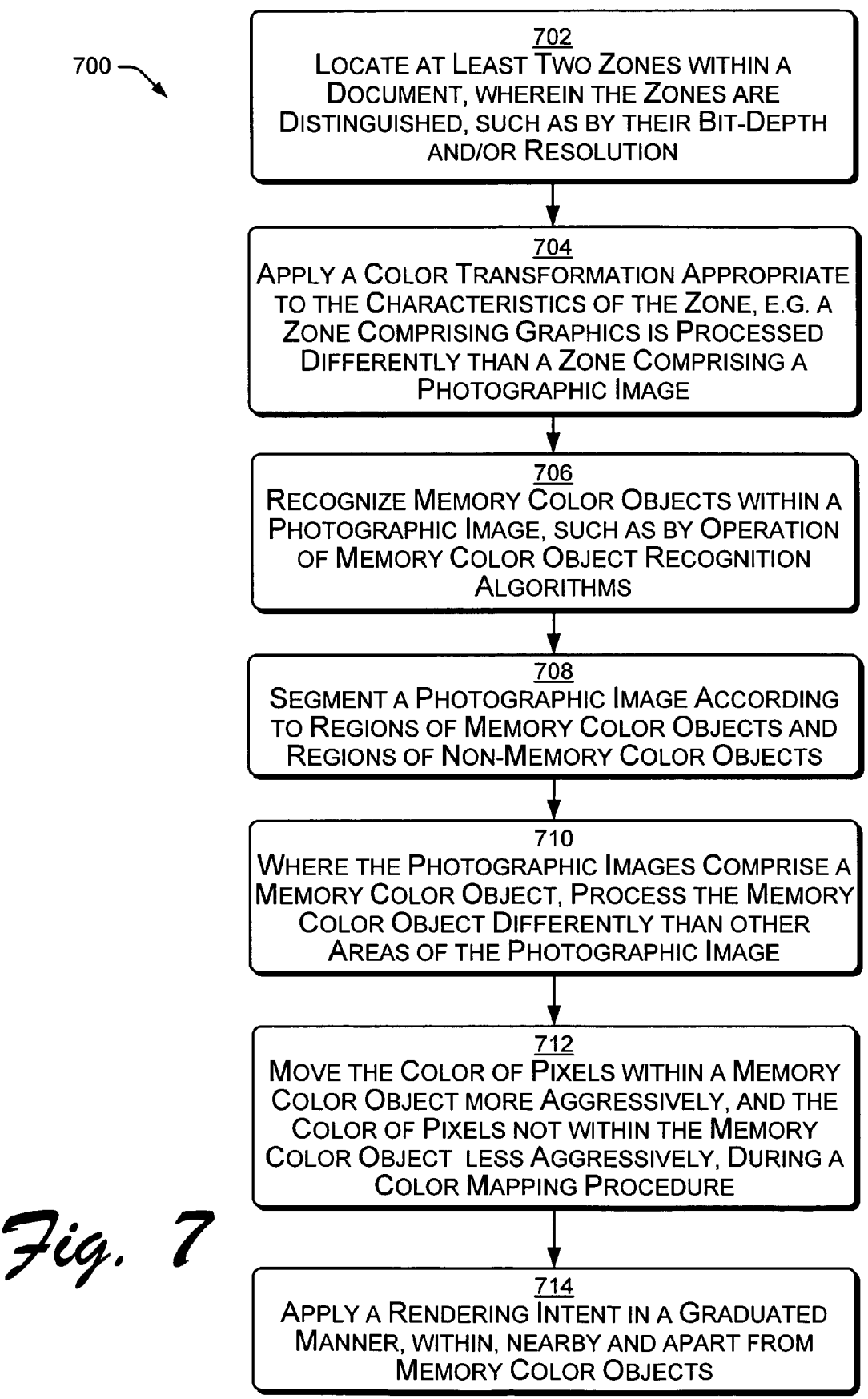
FIG. 7 is flow diagram showing a third exemplary method by which a color image processor may be operated.

FIG. 7 is flow diagram showing a third exemplary method 700 by which a color image processor 200 may be operated. At block 702, a zone analyzer 206 or similar procedure typically locates at least two zones within a document. The zones may be distinguished by many different algorithms, including typically those using information such as zone content, bit-depth and/or resolution.

At block 704, a color transformation appropriate to the characteristics of the zone is applied. For example, a zone comprising graphics is processed differently than a zone comprising a photographic image.

At block 706, memory color objects are recognized within a photographic image, such as by operation of memory color object segmenter 220 using memory color recognition algorithms.

At block 708, with one or more memory color objects recognized, a photographic image may be segmented according to regions of memory color objects and regions of non-memory color objects.

At block 710, where the photographic images comprise a memory color object, the memory color object is processed differently than other areas of the photographic image.

At block 712, the colors of pixels within a memory color object are moved more aggressively, and the colors of pixels not within the memory color object are moved less aggressively during a color mapping procedure. "Aggressive" movement of the pixels can be achieved in several ways. For example, the aggressive movement of pixel color can involve moving a greater percentage of the pixels. Additionally, where the color of a pixel is moved, it may be moved, on average, a greater distance (e.g. a longer arrow in the Lab color space of FIG. 4). Finally, to allow aggressive color movement without resulting in banding or posterization (e.g. the accentuation of colors and/or contrast), the weights associated with each pixel can be randomized according to $\delta \pm \sigma\delta$, where $\sigma=random(0, 0.5)$. This results in a range of 50-150% for the movement of each pixel's color within Lab space, wherein the expected movement is $\delta$. The value for $\delta$ can differ for the location of the pixel in the color space.

At block 714, a rendering intent may be applied in a graduated manner, within, nearby, and apart from memory color objects. In particular, the graduations may be controlled by application of a LUT which maps more or less aggressively according to weights, wherein the weights are related to the likelihood that the associated pixel is within a memory color object. Accordingly, the memory color object appears to integrate more naturally with other features within the photograph.

Although the disclosure has been described in language specific to structural features and/or methodological steps, it is to be understood that the appended claims are not limited to the specific features or steps described. Rather, the specific features and steps are exemplary forms of implementing this disclosure. For example, while actions described in blocks of the flow diagrams may be performed in parallel with actions described in other blocks, the actions may occur in an alternate order, or may be distributed in a manner that associates actions with more than one other block. Additionally, the elements of the methods disclosed may be performed by any desired means, such as by the execution of processor-readable instructions defined on a processor-readable media, such as a disk, a ROM or other memory device or by operation of an application specific integrated circuit (ASIC) or other hardware device. In one embodiment, the ROM may contain firmware implementing the modules of FIG. 2 according to one or more of the exemplary methods as seen in the flow charts of FIGS. 5-7. In alternative embodiments, an ASIC or software may be configured to contain similar information.

The invention claimed is:

1. A processor-readable medium comprising processor-executable instructions for:
   locating at least two zones within a document;
   recognizing content types within the at least two zones, wherein the content types comprise: text and lines; graphic images; photographic images; and background;
   applying a rendering intent to each of the at least two zones based on the content type within the zone; and
   merging the at least two zones into an image.

2. A processor-readable medium as recited in claim 1, comprising further instructions for:
   obtaining the document by operation of a scanner, a camera or an application.

3. A processor-readable medium as recited in claim 1, wherein applying the rendering intent comprises further instructions for:
   evaluating bit-depth and resolution within a zone to determine appropriate rendering intent.

4. A processor-readable medium as recited in claim 3, wherein the merging comprises further instructions for:
   merging a zone that was processed by a perceptual rendering intent with a zone which was processed by a saturation rendering intent.

5. A processor-readable medium as recited in claim 1, comprising further instructions for:
   recognizing memory color objects within a photographic image.

6. A processor-readable medium as recited in claim 1, comprising further instructions for:
   recognizing memory color objects, within a photographic image within a zone, using input comprising: geometric shape; object color; relative placement of memory color objects; and use or non-use of flash in captured images.

7. A processor-readable medium as recited in claim 1, comprising further instructions for:
   wherein the photographic images comprise a memory color object, processing the memory color object differently than other areas of the photographic image.

8. A processor-readable medium as recited in claim 1, comprising further instructions for:
   recognizing when a photographic image comprises a memory color object;
   applying different weights to pixels within areas inside the memory color object, near the memory color object, and remote from the memory color object; and
   color mapping pixels according to a weight applied.

9. A processor-readable medium as recited in claim 1, comprising further instructions for:
   applying graduations of a perceptual rendering intent to areas within, near, and removed from, a memory color object within a zone.

10. A processor-readable medium as recited in claim 1, comprising further instructions for:
    recognizing a memory color object in a photographic image;
    more aggressively moving pixel color of pixels within the memory color object; and
    less aggressively moving pixel color of pixels not within the memory color object.

11. A processor-readable medium as recited in claim 10, comprising further instructions for:
    segmenting photographic images, to result in segments with a memory color object and segments without a memory color object; and
    processing the segments differently.

12. A processor-readable medium as recited in claim 1, comprising further instructions for:
    recognizing a memory color object within at least one of the at least two zones by considering a geometric shape and location of the memory color object;
    comparing color within the memory color object to optimal memory colors; and
    where a difference in the comparison is less than a threshold value, color mapping at least some pixels contained within the memory color object at least part of the way to the optimal memory colors.

13. A processor-readable medium as recited in claim 1, comprising further instructions for:
    where at least one of the at least two zones has photographic content, recognizing memory color objects within the photographic content;
    determining if coloring of the memory content object is within a threshold of expectations; and
    mapping a group of pixels comprising the memory color object, wherein the mapping moves at least some of the group of pixels at least part of the way to the expectations.

14. A processor-readable medium as recited in claim 1, comprising further instructions for:
    recognizing at least one memory color object;
    determining if a color difference between the at least one object is greater than a threshold; and
    where the threshold has not been exceeded, applying a color transformation to the at least one memory color object.

15. A processor-readable medium comprising processor-executable instructions for:
    obtaining an image;
    analyzing the image to determine zones, wherein the zones are distinguished by their bit-depth; and
    applying a color transform appropriate to the characteristics of the zone.

16. A processor-readable medium as recited in claim 15, wherein applying the color transform comprises further instructions for:
    processing a zone comprising graphics differently than a zone comprising a photographic image.

17. A processor-readable medium as recited in claim 15, additionally comprising:

segmenting memory color objects within a zone comprising a photographic image; and processing the memory color objects differently than other areas of the photographic image within which the memory color object is located.

18. A processor-readable medium as recited in claim 15, wherein segmenting memory color objects comprises further instructions for:

employing memory color object recognition algorithms to detect memory color objects.

19. A processor-readable medium as recited in claim 18, wherein employing memory color object recognition algorithms comprises further instructions for:

recognizing memory color objects by shape, by color and by location within the image.

20. A processor-readable medium as recited in claim 19, comprising further instructions for:

recognizing memory color objects in part by whether flash was used in capturing the image.

21. A processor-readable medium as recited in claim 15, wherein the applying the perceptual color transformation comprises further instructions for:

approximating coloring of the memory color objects to a known optimal point.

22. A processor-readable medium as recited in claim 15, wherein applying a perceptual color transformation comprises further instructions for:

selecting pixels within a memory color object for color adjustment; and adjusting coloring of the selected pixels by a percentage of a distance separating an initial pixel color and a known optimal color.

23. A processor-readable medium as recited in claim 15, wherein applying a perceptual color transformation comprises further instructions for:

more aggressively moving pixel color of pixels within a memory color object; and less aggressively moving pixel color of pixels not within a memory color object.

24. A color image processor, comprising:

a zoning analyzer to find at least two types of zones within a document by distinguishing a measure of each zone's bit-depth;

a color mapping algorithm to apply a rendering intent to each of the at least two types of zones based on type of content within the zone; and an image manager to merge the at least two types of zones into a single image for output.

25. The color image processor as recited in claim 24, additionally comprising:

a memory object segmenter, to segment memory color objects within color photographs found in a zone found by the zoning analyzer.

26. The color image processor as recited in claim 25, additionally comprising:

a color weighing module to decide color weights for each pixel in segmented memory color objects; and a color transform module to move each pixel according to its weight.

27. The color image processor as recited in claim 24, additionally comprising:

a memory color object segmenter to recognize a memory color object, to compare color within the memory color object to optimal memory colors, and, where a difference in the comparison is less than a threshold value, to color map at least some pixels contained within the memory color object at least part of the way to the optimal memory colors.

28. The color image processor as recited in claim 24, additionally comprising a memory color object segmenter, configured to:

where a zone has photographic content, recognize a memory color object within the photographic content within the zone using geometric shape data;

determine if coloring of the memory color object is within a threshold of memory color expectations; and, if not, to map a subset of a group of pixels comprising the memory color object, wherein the mapping moves at least some of the group of pixels at least part of the way to the memory color expectations.

29. The color image processor as recited in claim 24, additionally comprising:

a memory color object segmenter, configured to recognize a memory color object by geometric configuration and to apply a color transformation to the memory color object, wherein the color transformation moves a percentage of a group of pixels within a geometric shape defined by the memory color object a percentage of a distance from an initial color to an expected color.

30. A color image processor, comprising:

means for obtaining an image;

means for analyzing zones within the image, and to thereby discover a photo image;

means for segmenting memory color objects within the photo image;

means for mapping coloring of a percentage of pixels within a memory color object, wherein the mapping moves the coloring a percentage of a distance separating an initial pixel color and a known optimal distance.

31. The color image processor of claim 30, additionally comprising:

means for finding text and lines;

means for finding foreground graphics; and means for finding a background.

32. The color image processor of claim 30, wherein the means for segmenting memory color objects additionally comprises:

means for recognizing memory color objects by shape, by color and by location within the image.

33. The color image processor of claim 30, additionally comprising:

means for using presence or absence of flash in recognizing memory color objects.

34. The color image processor of claim 30, wherein the means for mapping coloring additionally comprises:

means for more aggressively moving pixel color of pixels within a memory color object; and means for less aggressively moving pixel color of pixels not within a memory color object.

35. A method of color image processing, comprising:

obtaining an image;

demarking zones within the image, including: text; foreground graphics; foreground photographic images; and background;

segmenting the foreground photographic image according to regions of memory color object and non-memory color objects;

moving pixel color more aggressively toward an optimum color point, wherein the pixel is within the memory color object; and moving pixel color less aggressively, wherein the pixel is not within the memory color object.

36. The method as recited in claim 35, additionally comprising:
a rendering intent is applied in a graduated manner within, near-by and apart from the memory color object.

37. The method as recited in claim 35, wherein obtaining the image comprises creating the image in an authoring program, scanning the image or capturing the image with a camera.

38. The method as recited in claim 35, wherein demarking zones within the image comprises:
distinguishing zones based on bit-depth and pixel density.

39. The method as recited in claim 35, wherein segmenting memory color objects comprises:
recognizing memory color objects by shape, by color, by location within the image and by whether or not flash was used in obtaining the image.

40. The method as recited in claim 35, wherein moving pixel color more aggressively toward an optimum color point comprises:
rendering each zone based on content type within the zone.

* * * * *

UNITED STATES PATENT AND TRADEMARK OFFICE
CERTIFICATE OF CORRECTION

PATENT NO. : 7,333,240 B2  Page 1 of 1
APPLICATION NO. : 10/676237
DATED : February 19, 2008
INVENTOR(S) : Eduardo Amela et al.

It is certified that error appears in the above-identified patent and that said Letters Patent is hereby corrected as shown below:

In column 4, line 32, after "Delta E" insert -- = --.

Signed and Sealed this

Twelfth Day of August, 2008

JON W. DUDAS
*Director of the United States Patent and Trademark Office*